(12) United States Patent
Skalecki et al.

(10) Patent No.: US 10,284,661 B2
(45) Date of Patent: *May 7, 2019

(54) EFFICIENT PRIORITIZED RESTORATION OF SERVICES IN A CONTROL PLANE-BASED OPTICAL NETWORK

(71) Applicant: Ciena Corporation, Hanover, MD (US)

(72) Inventors: Darek Skalecki, Ottawa (CA); Gerard L. Swinkels, Ottawa (CA)

(73) Assignee: Ciena Corporation, Hanover, MD (US)

(*) Notice: Subject to any disclaimer, the term of this patent is extended or adjusted under 35 U.S.C. 154(b) by 7 days.

This patent is subject to a terminal disclaimer.

(21) Appl. No.: 15/861,022

(22) Filed: Jan. 3, 2018

(65) Prior Publication Data

US 2018/0131776 A1 May 10, 2018

Related U.S. Application Data

(63) Continuation of application No. 15/271,614, filed on Sep. 21, 2016, now Pat. No. 9,876,865.

(51) Int. Cl.
*H04B 10/032* (2013.01)
*H04L 29/08* (2006.01)
(Continued)

(52) U.S. Cl.
CPC .......... *H04L 67/16* (2013.01); *H04L 41/0668* (2013.01); *H04L 41/0816* (2013.01); *H04Q 11/0066* (2013.01); *H04B 10/032* (2013.01); *H04Q 2011/0016* (2013.01); *H04Q 2011/0077* (2013.01); *H04Q 2011/0081* (2013.01)

(58) Field of Classification Search
CPC combination set(s) only.
See application file for complete search history.

(56) References Cited

U.S. PATENT DOCUMENTS 6,914,912 B1 7/2005 Skalecki et al.
7,304,947 B2 12/2007 Skalecki et al.
(Continued)

OTHER PUBLICATIONS

E. Mannie, Generalized Multi-Protocol Label Switching (GMPLS) Architecture, Standards Track, The Internet Society, Oct. 2004, pp. 1-69.
(Continued)

*Primary Examiner* — David C Payne
*Assistant Examiner* — Omar S Ismail
(74) *Attorney, Agent, or Firm* — Clements Bernard Walker PLLC; Christopher L. Bernard; Lawrence A. Baratta, Jr.

(57) ABSTRACT

Systems and methods for efficient prioritized restoration of services implemented in a node in a network utilizing a control plane include releasing higher priority services affected by a fault on a link adjacent to the node immediately via control plane signaling such that the higher priority services mesh restore; tracking mesh restoration of the released higher priority services; and releasing lower priority services based on the tracking, subsequent to the mesh restoration of the higher priority services, wherein the higher priority services and the lower priority services comprise one or more of Optical Transport Network (OTN) connections, Dense Wavelength Division Multiplexing (DWDM) connections, and Multiprotocol Label Switching (MPLS) connections.

20 Claims, 26 Drawing Sheets

(51) Int. Cl.
*H04L 12/24* (2006.01)
*H04Q 11/00* (2006.01)

(56) References Cited

U.S. PATENT DOCUMENTS

| | | | |
|---|---|---|---|
| 7,376,086 B1 | 5/2008 | Paraschiv | |
| 7,590,051 B1 | 9/2009 | Skalecki et al. | |
| 7,639,631 B2 | 12/2009 | Ashwood-Smith et al. | |
| 7,774,474 B2 | 8/2010 | Ashwood-Smith et al. | |
| 7,995,569 B2 | 8/2011 | Ashwood-Smith et al. | |
| 8,125,925 B2 | 2/2012 | Skalecki et al. | |
| 8,166,183 B2 | 4/2012 | Swinkels et al. | |
| 8,402,121 B2 | 3/2013 | Skalecki et al. | |
| 8,553,707 B2 | 10/2013 | Swinkels et al. | |
| 8,593,961 B2 | 11/2013 | Skalecki et al. | |
| 8,750,141 B2 | 6/2014 | Skalecki et al. | |
| 8,817,798 B2 | 8/2014 | Skalecki et al. | |
| 8,854,955 B2 | 10/2014 | Prakash et al. | |
| 9,118,421 B2 | 8/2015 | Swinkels et al. | |
| 9,124,960 B2 | 9/2015 | Swinkels et al. | |
| 9,191,280 B2 | 11/2015 | Swinkels et al. | |
| 2002/0191539 A1* | 12/2002 | Rawlins | H04L 12/14 370/229 |
| 2003/0030866 A1* | 2/2003 | Yoo | H04L 45/00 398/48 |
| 2005/0063701 A1* | 3/2005 | Ovadia | H04Q 11/0066 398/45 |
| 2005/0185654 A1* | 8/2005 | Zadikian | H04J 14/0227 370/395.21 |
| 2007/0121507 A1* | 5/2007 | Manzalini | H04L 47/10 370/235 |
| 2008/0281987 A1 | 11/2008 | Skalecki et al. | |
| 2011/0222394 A1 | 9/2011 | Swinkels et al. | |
| 2011/0222862 A1 | 9/2011 | Boertjes et al. | |
| 2014/0147106 A1* | 5/2014 | Ahuja | H04B 10/032 398/5 |
| 2014/0147107 A1 | 5/2014 | Swinkels et al. | |
| 2015/0365189 A1* | 12/2015 | Prakash | H04J 14/0227 398/34 |
| 2017/0099354 A1* | 4/2017 | Moynihan | H04L 67/141 |

OTHER PUBLICATIONS

A. Doria et al., Forwarding and Control Element Separation (ForCES) Protocol Specification, Standards Track, ISSN: 2070-1721, Mar. 2010, pp. 1-124.
ITU-T, Telecommunication Standardization Sector of ITU, G.709/Y.1331, Interfaces for the optical transport network, Feb. 2012, pp. 1-238.
ITU-T, Telecommunication Standardization Sector of ITU, G.798, Characteristics of optical transport network hierarchy equipment functional blocks, Dec. 2012, pp. 1-390.
ITU-T, Telecommunication Standardization Sector of ITU, G.872, Architecture of optical transport networks, Oct. 2012, pp. 1-52.
ITU-T, Telecommunication Standardization Sector of ITU, G.7713. 2/Y.1704.2, Distributed Call and Connection Management: Signalling mechanism using GMPLS RSVP-TE, Mar. 2003, pp. 1-46.
ITU-T, Telecommunication Standardization Sector of ITU, G.8080/Y.1304, Architecture for the automatically switched optical network, Feb. 2012, pp. 1-124.

* cited by examiner

EFFICIENT PRIORITIZED RESTORATION OF SERVICES IN A CONTROL PLANE-BASED OPTICAL NETWORK

CROSS-REFERENCE TO RELATED APPLICATION(S)

The present patent/application is a continuation of U.S. patent application Ser. No. 15/271,614, filed Sep. 21, 2016, and entitled "EFFICIENT PRIORITIZED RESTORATION OF SERVICES IN A CONTROL PLANE-BASED OPTICAL NETWORK," the contents of which are incorporated by reference herein.

FIELD OF THE DISCLOSURE

The present disclosure generally relates to networking systems and methods. More particularly, the present disclosure relates to efficient prioritized restoration of services in a control-plane based optical network.

BACKGROUND OF THE DISCLOSURE

Networks, such as using Dense Wave Division Multiplexing (DWDM), Optical Transport Network (OTN), Ethernet, Multiprotocol Label Switching (MPLS and MPLS-Transport Profile (TP)), and the like, are deploying control plane systems and methods. Control planes provide an automatic allocation of network resources in an end-to-end manner. Example control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services or calls in the control plane. Control planes use available paths to route the services and program the underlying hardware accordingly.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein. Note, distributed control planes can be used in conjunction with centralized controllers in a hybrid deployment.

Restoration (also referred to as protection) is a key feature in networks where a backup (protection) path takes over for an active (working) path of a service or call when there is a failure in the active path. In particular, one mechanism for protection includes mesh restoration where services are released subsequent to a fault and rerouted, i.e., a new path is computed and the service is rerouted. In conventional implementations, different services are assigned different priorities (e.g., low or high, or even multiple stages priority) and higher priority services are released first to give them the first opportunity to reroute. The lower priority services are conventionally released after a delay based on a fixed timer, e.g., 5 sec. As described herein, the priority can be referred to as high or higher and low or lower and those of ordinary skill in the art will appreciate that a high or higher priority service is one that has a greater level of priority than a low or lower priority service. Specifically, these terms high or higher and low or lower are relative to one another.

Disadvantageously, delaying mesh restoration of low priority services by a fixed amount of time may unnecessarily hold back these services from being restored, e.g., if the timer is 5 sec. and all high priority services mesh restore in 1 sec. then the low priority services are unnecessarily held back for 4 sec., i.e., suffer 4 sec. longer traffic outage than is necessary. The amount of time to hold back mesh restoration for low priority services, or equivalently how much time to allow the high priority services to mesh restore first, is an engineering exercise. This exercise depends on i) the number of nodes and links in the network, ii) how far from source node(s) of the services the failure occurs, iii) the proportion of low priority services to high priority services that fail, and iv) the bandwidth utilization of the network, and other factors. Accordingly, a very conservative number is usually chosen for the hold off timer such as 5 sec., and usually high priority services can mesh restore significantly before the 5 sec. timer expires.

Ideally, the low priority services should be triggered to mesh restore as soon as the high priority services finish. Note that "as soon as all High Priority SNCs finish mesh restoration" includes the cases when high priority services cannot mesh restore due to the network's inability to meet their constraints, i.e., mesh restoration of low priority services should be triggered even if some high priority services cannot be mesh restored, but only once the network determines it cannot satisfy their constraints.

BRIEF SUMMARY OF THE DISCLOSURE

In an embodiment, a method for efficient prioritized restoration of services implemented in a node in a network utilizing a control plane includes, responsive to detecting a fault on a link adjacent to the node, releasing higher priority services affected by the fault immediately via control plane signaling such that the higher priority services mesh restore; maintaining a list of the released higher priority services; tracking mesh restoration of the released higher priority services; and releasing lower priority services based on the tracking, subsequent to the immediate mesh restoration of the higher priority services. The releasing higher priority services can include inclusion of a unique identifier to track each of the higher priority services, and wherein the tracking can include receiving a reflection of the unique identifier from a source node. The unique identifier can be used to track one or more faults, and the tracking can be performed on a per link basis with the releasing lower priority services performed once all of the higher priority services are addressed. The unique identifier can include a time stamp appended with a unique number. The releasing lower priority services can include releasing subsequent to determining that all of the released higher priority services have been addressed in the network. All of the released higher priority services have been addressed in the network when one of i) all of the released higher priority services are restored, ii) some of the higher priority services are unable to restore, and the remaining higher priority services are restored, and iii) expiration of a timer.

A source node for associated released higher priority services can determine new paths for each and send a control plane message which indicates the associated released higher priority have been addressed. The associated released higher priority services can be addressed by one of successful restoration, and a determination restoration is not possible. The control plane message can be sent after one of i) after the associated released higher priority services are addressed based on all release messages received in a time period and ii) after the associated released higher priority services are addressed based on knowing a quantity of the associated released higher priority services based on the control plane signaling. The higher priority services and the lower priority services can include one or more of Optical Transport Network (OTN) connections, Dense Wavelength Division Multiplexing (DWDM) connections, and Multiprotocol Label Switching (MPLS) connections.

In another embodiment, an apparatus adapted for efficient prioritized restoration of services implemented in a node in a network utilizing a control plane includes circuitry adapted to release higher priority services affected by the fault immediately via control plane signaling such that the higher priority services mesh restore responsive to detecting a fault on a link adjacent to the node; circuitry adapted to maintain a list of the released higher priority services; circuitry adapted to track mesh restoration of the released higher priority services; and circuitry adapted to release lower priority services based on the circuitry adapted to track, subsequent to the immediate mesh restoration of the higher priority services. The circuitry adapted to release higher priority services can include inclusion of a unique identifier to track each of the higher priority services, and wherein the circuitry adapted to track can include receiving a reflection of the unique identifier from a source node. The circuitry adapted to release lower priority services can include releasing subsequent to determining that all of the released higher priority services have been addressed in the network. A source node for associated released higher priority services can determine new paths for each and send a control plane message which indicates the associated released higher priority have been addressed. The higher priority services and the lower priority services can include one or more of Optical Transport Network (OTN) connections, Dense Wavelength Division Multiplexing (DWDM) connections, and Multiprotocol Label Switching (MPLS) connections.

In a further embodiment, a node adapted for efficient prioritized restoration of services in a network utilizing a control plane includes one or more ports; and a controller communicatively coupled to the one or more ports, wherein the controller is adapted to release higher priority services affected by the fault immediately via control plane signaling such that the higher priority services mesh restore responsive to detecting a fault on a link adjacent to the node, maintain a list of the released higher priority services, track mesh restoration of the released higher priority services, and release lower priority services based on the circuitry adapted to track, subsequent to the immediate mesh restoration of the higher priority services. The higher priority services can be released with inclusion of a unique identifier to track each of the higher priority services, and the mesh restoration can be tracked through receiving a reflection of the unique identifier from a source node. The lower priority services can be released subsequent to a determination that all of the released higher priority services have been addressed in the network. A source node for associated released higher priority services can determine new paths for each and send a control plane message which indicates the associated released higher priority have been addressed. The higher priority services and the lower priority services can include one or more of Optical Transport Network (OTN) connections, Dense Wavelength Division Multiplexing (DWDM) connections, and Multiprotocol Label Switching (MPLS) connections.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various embodiments, the present disclosure relates to systems and methods for efficient prioritized restoration of services in a control-plane based optical network. The systems and methods provide immediate restoration of the low priority services subsequent to the high priority services restoring, without the use of artificial, fixed hold off timers. Thus, low priority services do not experience an undue and unnecessary delay. To accomplish this, the systems and methods use notifications by piggybacking triggers in existing routing messages as a result of high priority service restoration. The nodes adjacent to faults correlate these notifications with the previously sent release messages, and once the associated high priority services are restored, each node knows to release lower priority services immediately without requiring fixed timers.

Example Network

Figure 1:
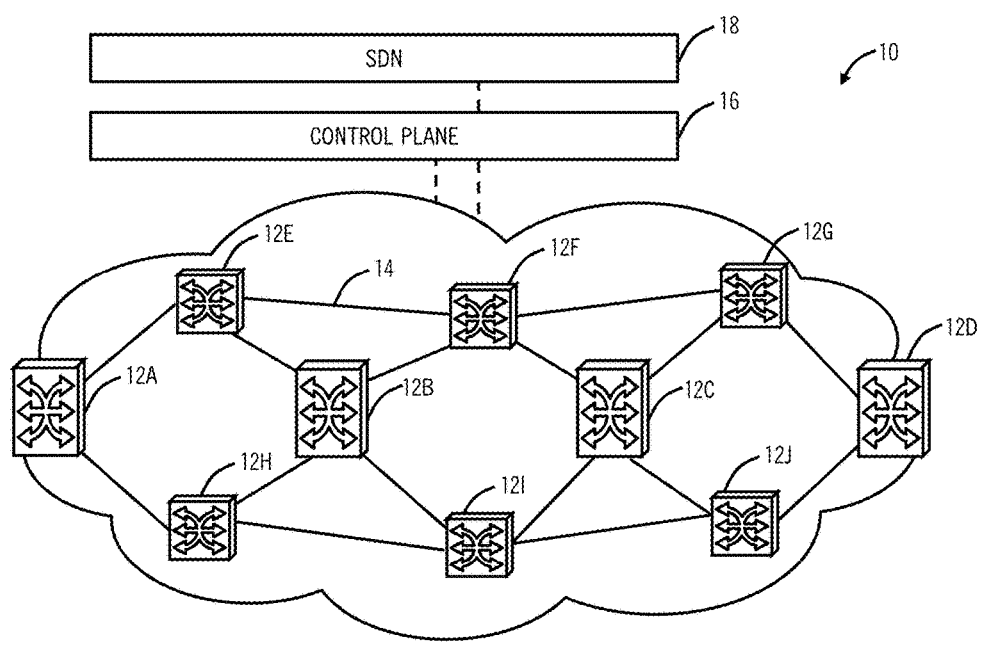
FIG. 1 is a network diagram of an example network with various interconnected nodes.
Figure 2:
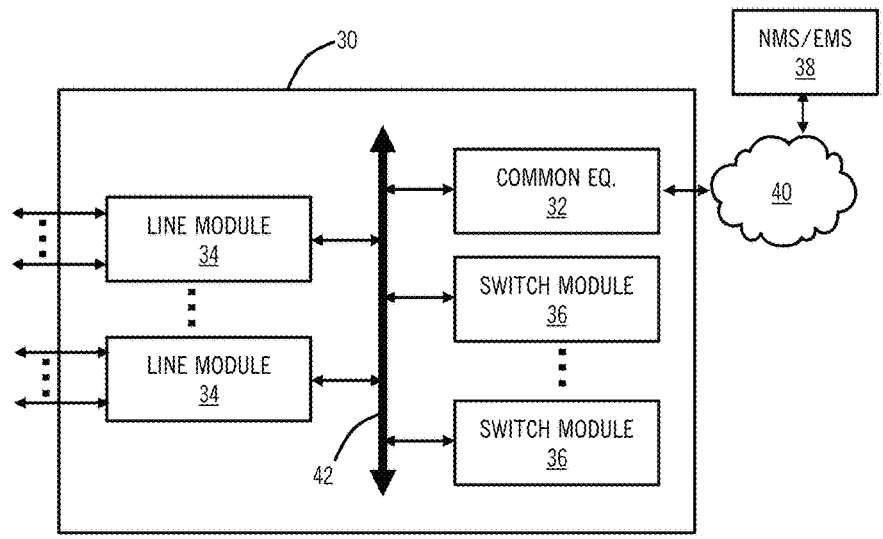
FIG. 2 is a block diagram of an example node for use with the systems and methods described herein.

Referring to FIG. 1, in an embodiment, a network diagram illustrates an example network 10 with various interconnected nodes 12 (illustrated as nodes 12A-12J). The nodes 12 are interconnected by a plurality of links 14. The nodes 12 communicate with one another over the links 14 through Layer 0 (L0) such as optical wavelengths (DWDM), Layer 1 (L1) such as OTN, Layer 2 (L2) such as Ethernet, MPLS, etc., and/or Layer 3 (L3) protocols. The nodes 12 can be network elements which include a plurality of ingress and egress ports forming the links 14. An example node implementation is illustrated in FIG. 2. The network 10 can include various services or calls between the nodes 12. Each service or call can be at any of the L0, L1, L2, and/or L3 protocols, such as a wavelength, an SNC, an LSP, etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an embodiment, the control plane 16 can utilize ASON, GMPLS, OSRP, MPLS, Open Shortest Path First (OSPF), Intermediate System-Intermediate System (IS-IS), or the like. Those of ordinary skill in the art will recognize the network 10 and the control plane 16 can utilize any type of control plane for controlling the nodes 12 and establishing, maintaining, and restoring calls or services between the nodes 12.

An SDN controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof.

In the terminology of ASON and OSRP, sub-network connections (SNC) are end-to-end signaled paths or calls since from the point of view of a client signal, each is a single network segment. In GMPLS, the connections are an end-to-end path referred to as LSPs. In SDN, such as in OpenFlow, services are called "flows." In the various descriptions herein, reference is made to SNCs for illustration only of an embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

For mesh restoration, the SNCs can be provisioned with a priority level such as high priority or low priority (multiple level priority schemes are also contemplated). SNCs with high priority are immediately released based on RELEASE messages sent from nodes adjacent to a fault to source nodes of the SNCs. SNCs with low priority are delayed for their RELEASE messages allowing more time for the high priority SNCs to restore. The systems and methods provide deterministic timing for the release of lower priority SNCs, immediately after the high priority SNCs restore, without resorting to artificial hold off timers that are intentionally engineered conservatively. Also, priority can be used for other aspects in the network 10 such as preemption, reservation of resources, etc.

Example Network Element/Node

Referring to FIG. 2, in an embodiment, a block diagram illustrates an example node 30 for use with the systems and methods described herein. In an embodiment, the example node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network (DCN) 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc., as well as future rates and formats.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as a type of network element. For example, in another embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one example node 30 for the systems and methods described herein.

Example Controller

Figure 3:
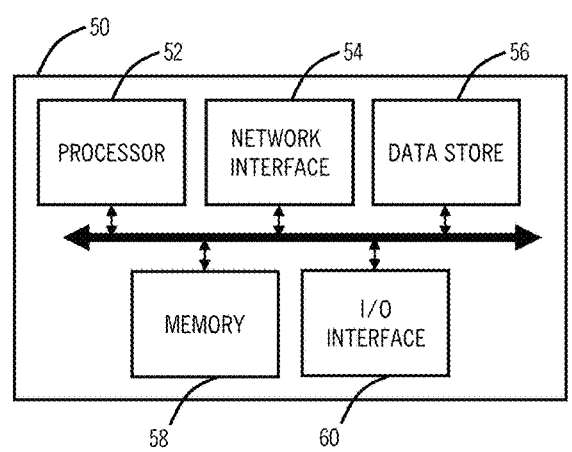
FIG. 3 is a block diagram of a controller to provide control plane processing and/or operations, administration, maintenance, and provisioning (OAM&P) for the node of FIG. 2, and/or to implement a Software Defined Networking (SDN) controller.

Referring to FIG. 3, in an embodiment, a block diagram illustrates a controller 50 to provide control plane processing and/or operations, administration, maintenance, and provisioning (OAM&P) for the node 30, and/or to implement a Software Defined Networking (SDN) controller or application. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card or a wireless local area network (WLAN) card. The network interface 54 can include address, control, and/or data connections to enable appropriate communications on the network 10, 40. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an embodiment, the controller 50 is configured to communicate with other controllers 50 in the network 10 to operate the control plane 16 for control plane signaling as well as to communication to the SDN controller, an EMS, an NMS, etc. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers 50 can include an in-band signaling mechanism utilizing OTN overhead. The General Communication Channels (GCC) defined by ITU-T Recommendation G.709, which is incorporated herein by reference, are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane 16 is a distributed control plane; thus, a plurality of the controllers 50 can act together to operate the control plane 16 using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service.

Path computation generally includes determining a path, i.e. traversing the links through the nodes from the originating node to the destination node based on a plurality of constraints such as administrative weights on the links, bandwidth availability on the links, etc. As part of mesh restoration, a source node is configured to receive a RELEASE message from nodes 12 adjacent to a fault, to compute a new path exclusive of the fault, to signal the new path, and to cause implementation of the new path responsive to successful signaling. As described herein, conventionally, this process is performed hierarchically with high priority SNCs released first and then low priority SNCs released after a fixed delay to give the high priority SNCs a head start, i.e., first access to the resources.

Conventional Mesh Restoration Techniques

Again, present implementations of the control plane 16, such as OSRP, ASON, etc., can support two priority levels—high priority and low priority for SNCs. High priority SNCs mesh restore immediately a result of a link failure and low priority SNCs mesh restore a configured time after the link failure, e.g., 5 sec. In a nutshell, when a link failure occurs, the control plane 16 (controllers 50) on the adjacent nodes immediately triggers RELEASE messages for all high priority SNCs on the failed link, whereas it starts a fixed timer (e.g., 5 sec.) to trigger RELEASE messages for all low priority SNCs. The RELEASE messages cause the SNCs to be released from their current (failed) paths and once a RELEASE message reaches the source node of an SNC then such node immediately triggers mesh restoration of the SNC onto an alternate path bypassing the failed link to recover traffic flow.

Efficient Prioritized Mesh Restoration Process

Figure 4:
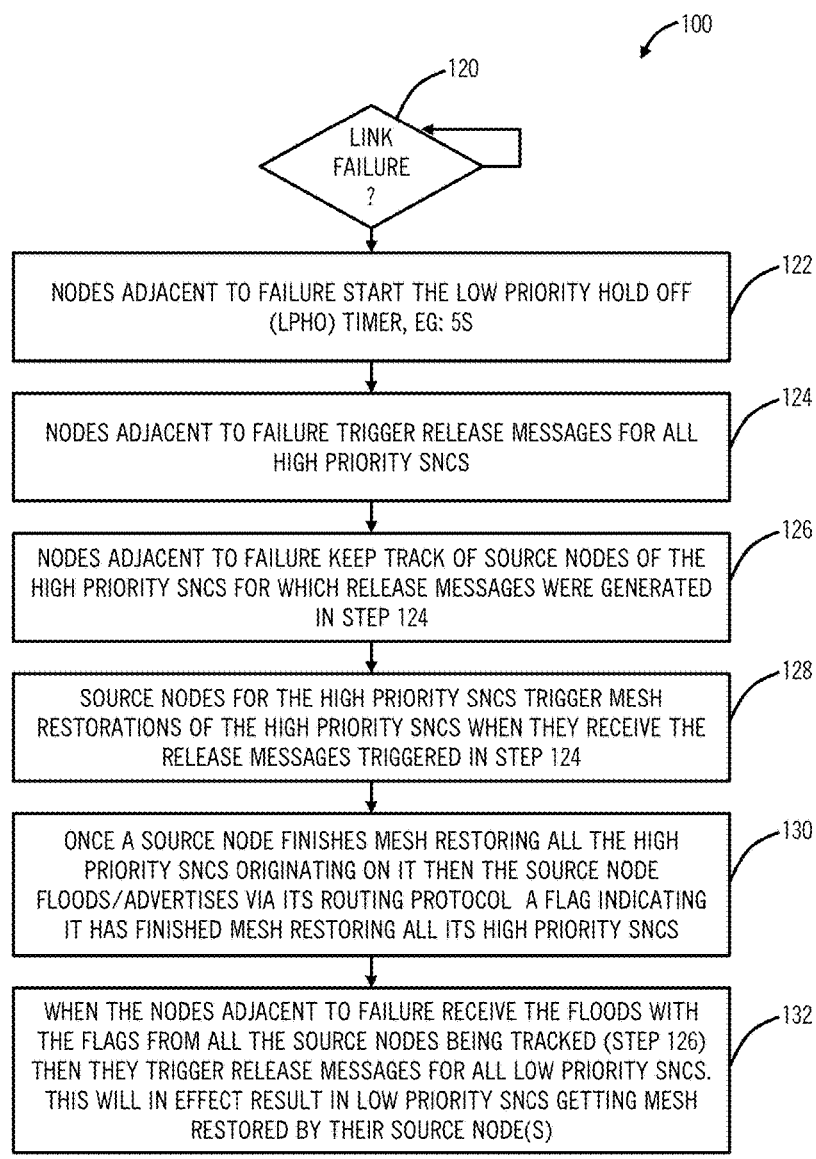
FIG. 4 is a flowchart of an efficient mesh restoration process such as for use in the network of FIG. 1.

Referring to FIG. 4, in an embodiment, a flowchart illustrates an efficient mesh restoration process 100 for use in the network 10. Responsive to a link failure (step 120), the nodes adjacent to the failure start the Low Priority Hold Off (LPHO) timer, such as 5 sec. (step 122). Note, the LPHO timer is used in the process 100 as a backstop to release the low priority SNCs if all of the high priority SNCs do not mesh restore. If all of the high priority SNCs mesh restore before the expiration of the LPHO timer, it is unused as the low priority SNCs will trigger restoration immediately after all of the high priority SNCs mesh restore. Next, the nodes adjacent to the failure trigger RELEASE messages for all high priority SNCs (step 124).

The process 100 includes the nodes adjacent to the failure keeping track of source nodes of the high priority SNCs for which RELEASE messages were generated in step 124 (step 126). Here, there is a correlation of RELEASE messages sent to keep track of mesh restoration. Concurrent with the step 126, the source nodes for the high priority SNCs trigger mesh restorations of the high priority SNCs when they receive the RELEASE messages triggered in step 124 (step 128). Here, the source nodes receive the RELEASE message, determine a new path exclusive of the failure, and signal the new path via the control plane 16.

Once a source node finishes mesh restoring all of the high priority SNCs originating on it, then the source node floods/advertises via its routing protocol with a FLAG indicating it has finished mesh restoring all of its high priority SNCs (step 130). The FLAG includes information allowing the nodes adjacent to the failure to keep track of which high priority SNCs have mesh restored.

Note that a source node finishes mesh restoring an SNC once such SNC is actually mesh restored to an alternate path or once the source node determines that the network cannot meet the SNC's constraints, i.e., the SNC cannot be mesh restored. Of note here, when high priority SNCs actually mesh restore to an alternate route, they change link bandwidth availability for all links along their routes, and, in particular, for links emanating from the source node and such link bandwidth changes require flooding of bandwidth update routing messages.

The process 100 includes piggyback the FLAG on such bandwidth update routing messages, i.e., an efficient way to disseminate when a source node has finished with mesh restorations of its high priority SNCs—not new messages, but using existing messages to communicate such information. In case bandwidth update routing messages are not flooded because say link bandwidth thresholds have not been crossed, or high priority SNCs fail to mesh restore due to inability to meet their constraints (e.g., lack of available bandwidth), then source node must instigate an explicit routing message to flood/advertise the FLAG or the process 100 would have to rely on the LPHO timer expiry. The process 100 contemplates either or both approaches.

When the nodes adjacent to the failure receive the floods with the FLAGs from all the source nodes being tracked (step 126), then they trigger RELEASE messages for all low priority SNCs (step 132). This will in effect result in low priority SNCs getting mesh restored by their source node(s), and this shall happen after all high priority SNCs mesh restored or had a chance to mesh restore but could not (such as due to lack of available bandwidth). Note that nodes adjacent to failure either receive floods/advertisements with the FLAGs from all the source nodes or the LPHO timer expires (started in step 122). Either event can trigger RELEASE messages of the failed low priority SNCs and thus their mesh restorations.

Again, the process 100 above is described with reference to SNCs but is equally contemplated for LSPs or any other services managed by the control plane 16. Further, the process 100 is described with reference to two priority states—low and high, but can be expanded to support multiple levels of priority by repeating the process 100 for each current priority and releasing the next set of services accordingly.

Figure 5:
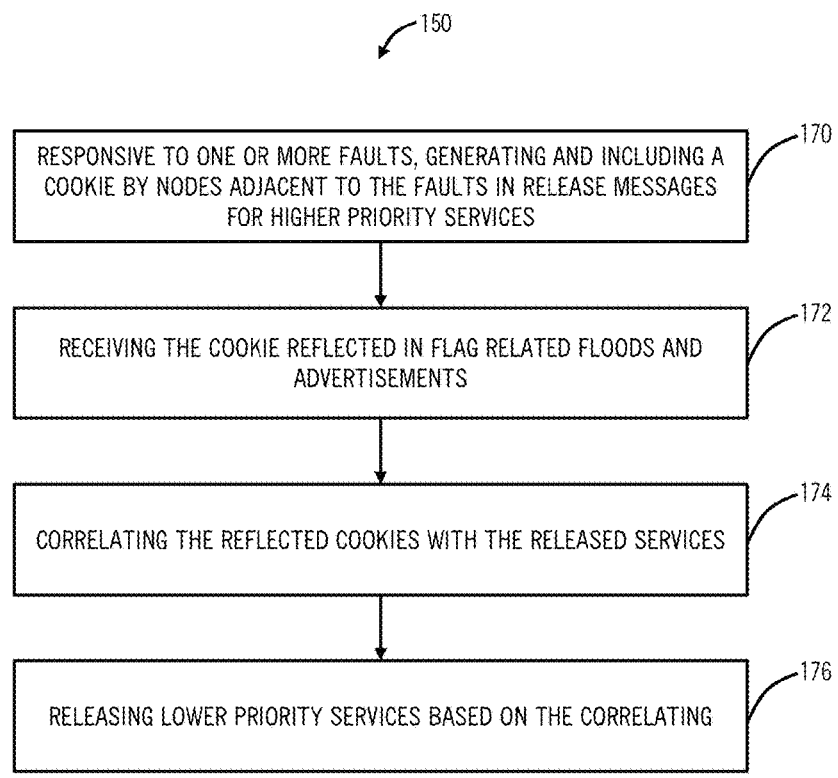
FIG. 5 is a flowchart of an efficient mesh restoration process such as for use in the network of FIG. 1, extending the process of FIG. 4 to support multiple failures.

Referring to FIG. 5, in an embodiment, a flowchart illustrates an efficient mesh restoration process 150 for use in the network 10, extending the process 100 to support multiple failures. To support multiple failures, there is a need for a unique COOKIE, i.e., some unique identifier to correlate services between the RELEASE and the FLAG flood reflection, to be generated by the nodes adjacent to the failure and included in the RELEASE messages for high priority SNCs. These COOKIEs are reflected back in the FLAG related floods/advertisements. This enables nodes adjacent to a failure to correlate which FLAGs (indicating completion of mesh restoration of all high priority SNCs by a source node) correspond to which failures and thus which low priority SNCs need to be released.

The process 150 includes, responsive to one or more faults, generating and including a COOKIE by nodes adjacent to the faults in RELEASE messages for higher priority services (e.g., SNCs) (step 170). This COOKIE is unique to a particular released high priority SNC and used by the process 150 to determine when the higher priority SNC is restored. The process 150 includes receiving the COOKIE reflected in FLAG related floods and advertisements in the control plane 16 (step 172). The nodes adjacent to the fault include correlating the reflected COOKIES with the released services (step 176), and based on this correlating, the nodes adjacent to the faults release the lower priority services, e.g., after all of the higher priority services are released or after a fixed time if all of the high priority services are not restored (step 178).

The COOKIE may simply be a time stamp or some unique and running nodal number. The COOKIE is generated by the nodes adjacent to the failure and reflected by source nodes along with the FLAG in the advertisements/floods. In case the COOKIE is a time stamp, it can be appended with a unique number to differentiate two different failures happening at the same time. For example, assume two failures happen at exactly same time and thus have the same time stamp. To differentiate the two failures, the COOKIES can be X_1 and X_2, i.e., RELEASE messages for failure #1 carry COOKIE=X_1 and RELEASE messages for failure #2 carry COOKIE=X_2, where X=time.

It shall be noted that when multiple failures occur, the nodes adjacent to the failure can trigger mesh restoration of low priority SNCs in one of the following paradigms: i) adjacent nodes wait for all affected High Priority SNCs on the node to be mesh restored before triggering mesh restoration of Low Priority SNCs, or adjacent nodes wait for all affected High Priority SNCs on a particular failed link to be mesh restored before triggering mesh restoration of Low Priority SNCs on that link, using the COOKIE for the determination.

Another aspect relates to the source node determining when it has finished mesh restoring all its high priority SNCs. Since the RELEASE messages at the nodes adjacent to the failure were triggered independently for each high priority SNC and such messages can travel along different paths in the network; such RELEASE messages can arrive independently and not all at once at the source node. This raises the question: how does the source node know how many high priority SNCs were released by the nodes adjacent to the failure and thus how to know when all such SNCs were mesh restored?

There are a couple approaches. First, since RELEASE messages will arrive independently with short (millisecond) intervals in-between, the source node may employ some sort of Hold Off timer, e.g., 200 ms. That is, all RELEASE messages received within 200 ms of the receipt of the very first RELEASE message are considered part of the same failure and thus once all such SNCs finish mesh restoring then the FLAG (with/without the COOKIE extension) will be flooded as per the actions described herein. However, this first approach is not optimal as some RELEASE messages could be received outside the Hold Off timer.

Second, the nodes adjacent to the failure know how many RELEASE messages will be launched towards each source node, and thus they can put that info into the RELEASE messages, i.e., some identification of how many RELEASE messages to expect to each source node. For example, 1 out of 5 in the first RELEASE message, 2 out of 5 in the second RELEASE message, etc. Once the source node receives the RELEASE messages (with/without COOKIE extensions also), it will know how many RELEASE messages to expect. Note that since some RELEASE messages may get lost in the network for whatever reason, e.g., inter-nodal communication failure or node reboot, the source node can still apply some sort of Hold Off timer as mentioned above, in addition to identifying how many RELEASE messages to expect in case of loss in transit.

Once a source node determines how many high priority SNCs it is mesh restoring and triggers their mesh restorations, then knowing when such SNCs complete mesh restoration depends on the receipt of mesh restoration related CONNECT messages, i.e., once CONNECT messages for all high priority SNCs are received, then all high priority SNCs have completed mesh restoring. At this time, the source node is ready to advertise/flood the FLAG (with/without the COOKIE extension).

For example, for multiple failures, consider node X which experiences two interface failures, namely the first failure causes the following SNCs to fail: A (high priority), B (high priority), C (low priority), D (low priority), and the second failure causes the following SNCs to fail: Y (High Priority), Z (Low Priority). Upon the first failure, the adjacent node X launches RELEASE messages for SNCs A and B and awaits a FLAG indicating A and B have completed mesh restoration. Upon the second failure, the adjacent node X launches a RELEASE message for the SNC Y and awaits FLAG indicating Y completed mesh restoration.

When a flood/advertisement arrives at X with a FLAG, X does not know whether this FLAG indicates completion of mesh restoration for SNCs A and B, or for SNC Y, i.e., X does not know whether to launch RELEASE messages for low priority SNCs of the first failure (SNCs C and D) or to launch RELEASE messages for low priority SNCs of the second failure (SNC Z). This is why a COOKIE is needed, and one COOKIE included in high priority SNC RELEASE messages related to the first failure and the corresponding FLAG related flood/advertisement, and a different COOKIE included in high priority SNC RELEASE messages related to second failure and the corresponding FLAG related flood/advertisement.

The processes 100, 150 contemplate operation in the network 10 or equivalent. In an embodiment, the control plane 16 is ASON, OSRP, GMPLS, etc. operating with OTN, SONET, SDH, and/or DWDM connections. However, the processes 100, 150 can also apply to MPLS and MPLS-TP based networks.

Efficient Prioritized Mesh Restoration—Single Fault Example

Figure 6:
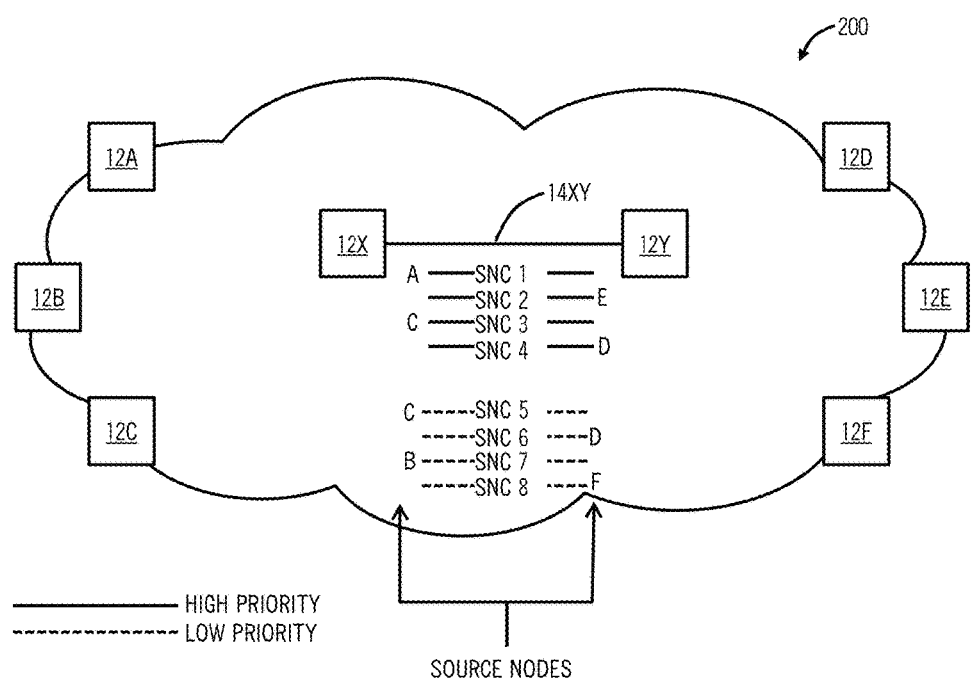
FIGS. 6-14 are network diagrams of a network illustrating mesh restoration techniques for eight total SNCs including four high priority SNCs and four low priority SNCs using the process of FIG. 4.

Referring to FIGS. 6-14, in an embodiment, network diagrams illustrate a network 200 showing mesh restoration techniques for eight total SNCs including four high priority SNCs and four low priority SNCs using the process 100, for a single fault. FIG. 6 illustrates the network 200 with nodes 12A, 12B, 12C, 12D, 12E, 12F, 12X, 12Y. For illustration purposes in FIGS. 6-14, links are omitted for ease of illustration except for link 14XY which connects the nodes 12X, 12Y. The network 200 is shown with eight SNCs, labeled SNC 1, SNC 2, SNC 3, SNC 4, SNC 5, SNC 6, SNC 7, SNC 8. SNCs 1-4 are high priority and SNCs 5-8 are low priority, and each of these SNCs traverses the link 14XY. The source node 12A is a source for the SNC 1, the source node 12B is a source for the SNC 7, the source node 12C is a source for the SNCs 3, 5, the source node 12D is a source for the SNCs 4, 6, the source node 12E is a source for the SNC 2, and the source node 12F is a source for the SNC 8.

Figure 7:
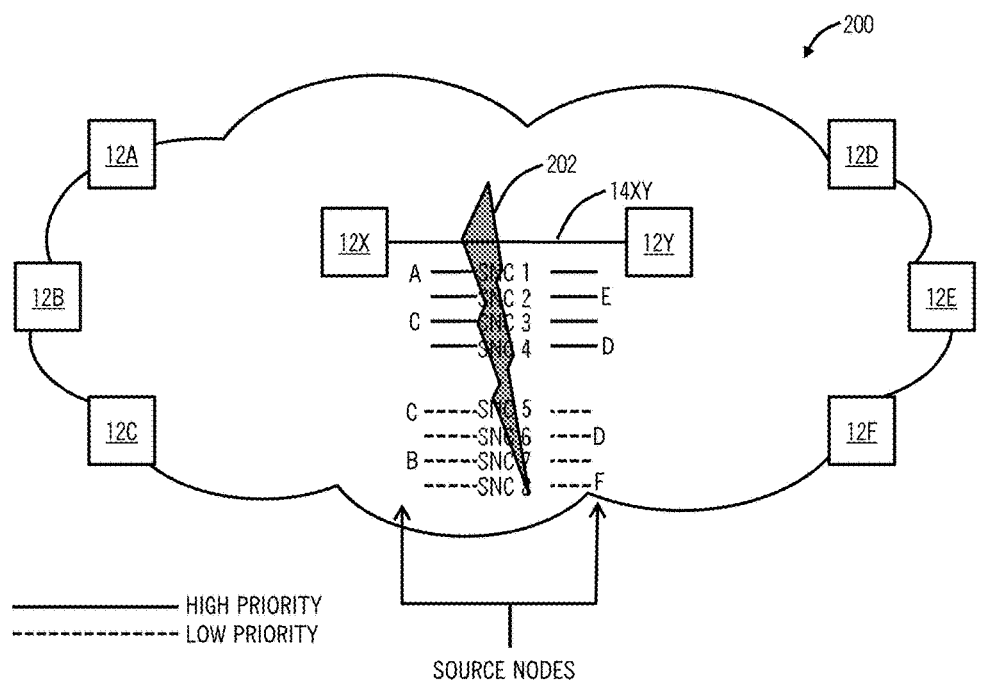
Figure 8:
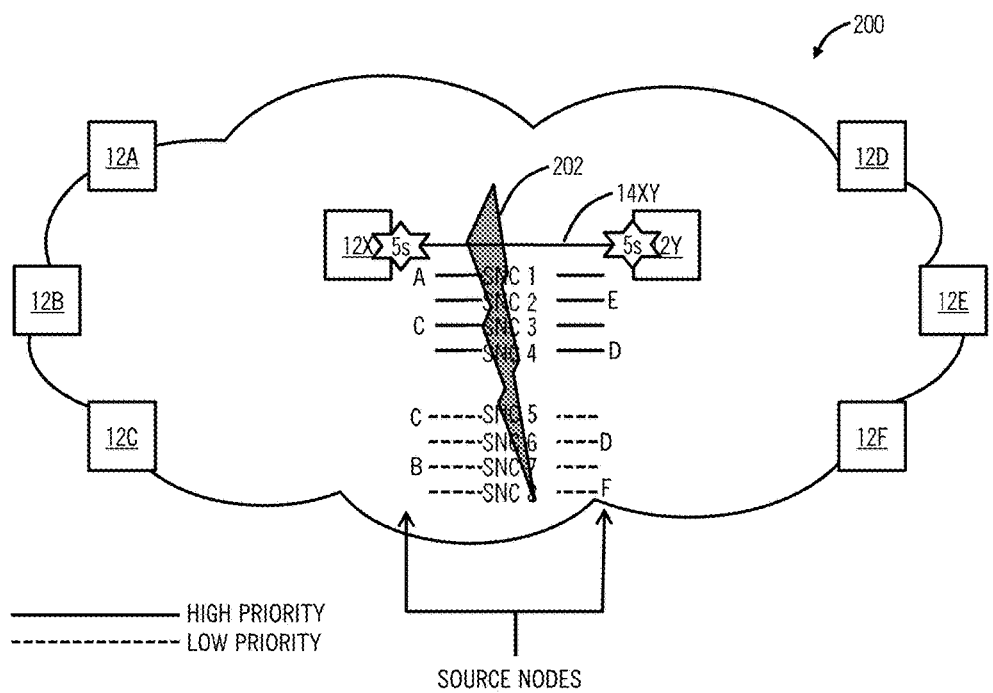
Figure 9:
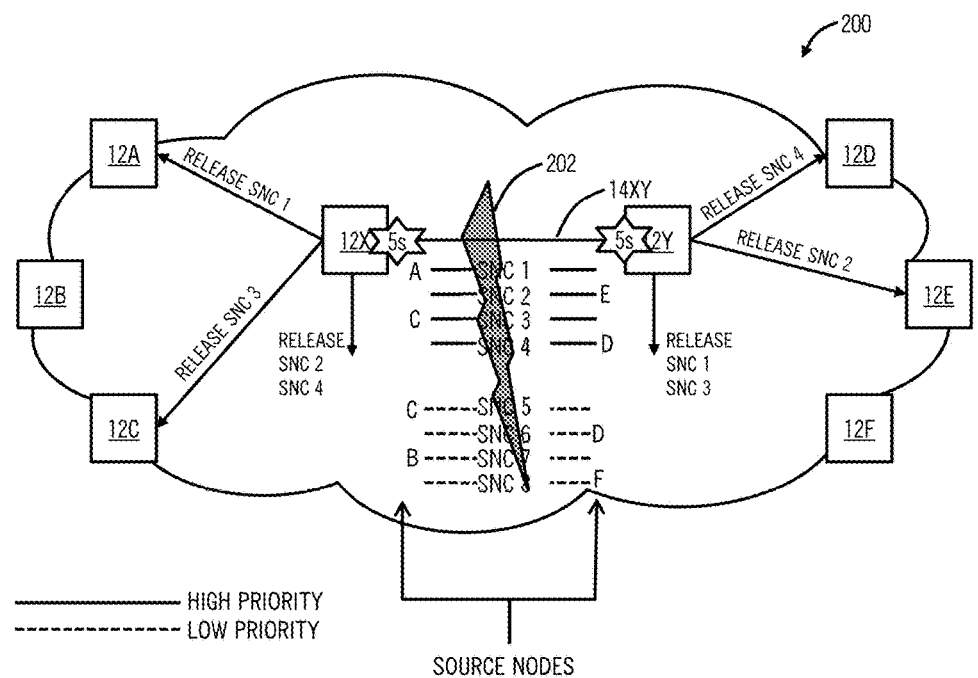

In FIG. 7, at step 120, a fault 202 is experienced on the link 14XY affecting all of the SNCs 1-8. In FIG. 8, at step 122, the nodes 12X, 12Y which are adjacent to the fault 202 start a Low Priority Hold Off (LPHO) timer, e.g., 5 sec. In FIG. 9, at step 124, the nodes 12X, 12Y trigger RELEASE messages for all of the high priority SNCs 1-4 to their associated source nodes. Here, the LPHO is still running, and the RELEASE messages are initiated by both of the nodes 12X, 12Y for each of the SNCs 1-4.

Figure 10:
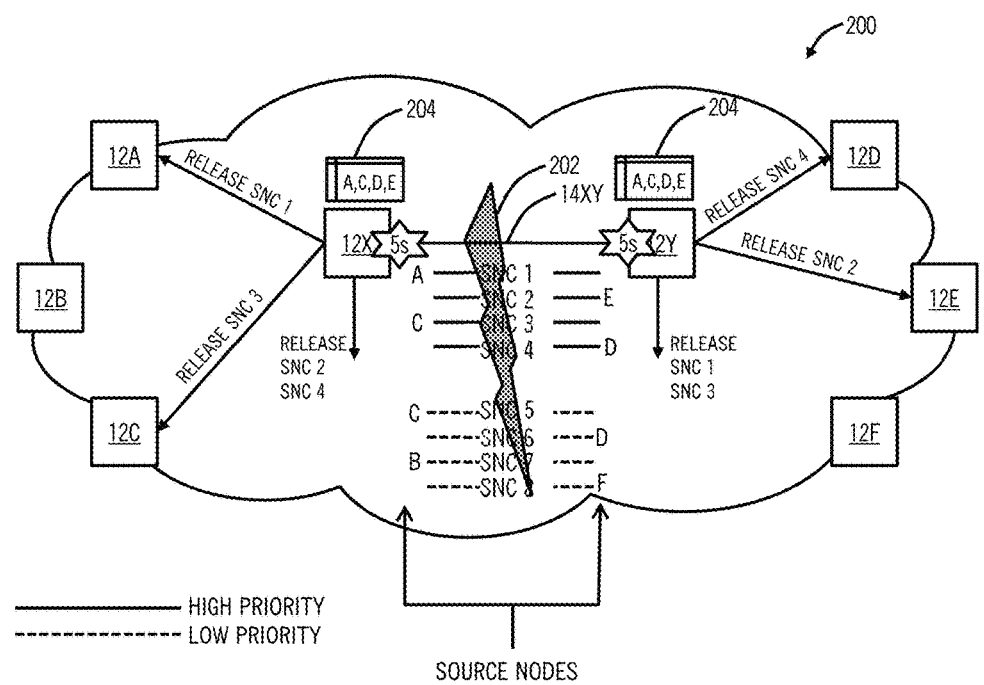

In FIG. 10, at step 126 the nodes 12X, 12Y keep track of the source nodes of the high priority SNCs 1-4 such as by maintaining a list 204, database, etc. The list 204, database, etc. can be maintained in memory at the nodes 12X, 12Y and is used to track the status of the mesh restoring high priority SNCs 1-4. In particular, the list 204 includes the source nodes 12A, 12C, 12D, 12E meaning that the nodes 12X, 12Y need to receive FLAG floods/advertisements from these four nodes prior to releasing the SNCs 5-8 (or upon expiry of the LPHO).

Figure 11:
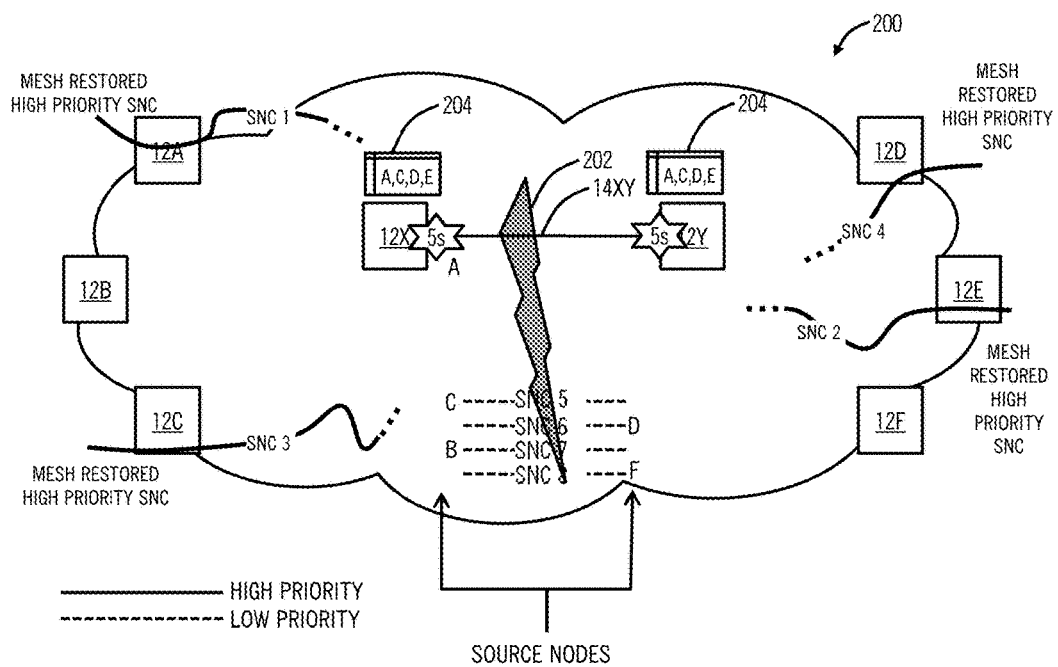

In FIG. 11, at step 128, the source nodes 12A, 12C, 12D, 12E receive the RELEASE messages for the high priority SNCs 1-4 and trigger mesh restoration of the high priority SNCs 1-4 (step 128). The sources nodes 12A, 12C, 12D, 12E compute new paths exclusive of the link 14XY, and signal via the control plane 16 to establish the new paths. In FIG. 11, the SNCs 1-4 are reconnected via the new paths.

Figure 12:
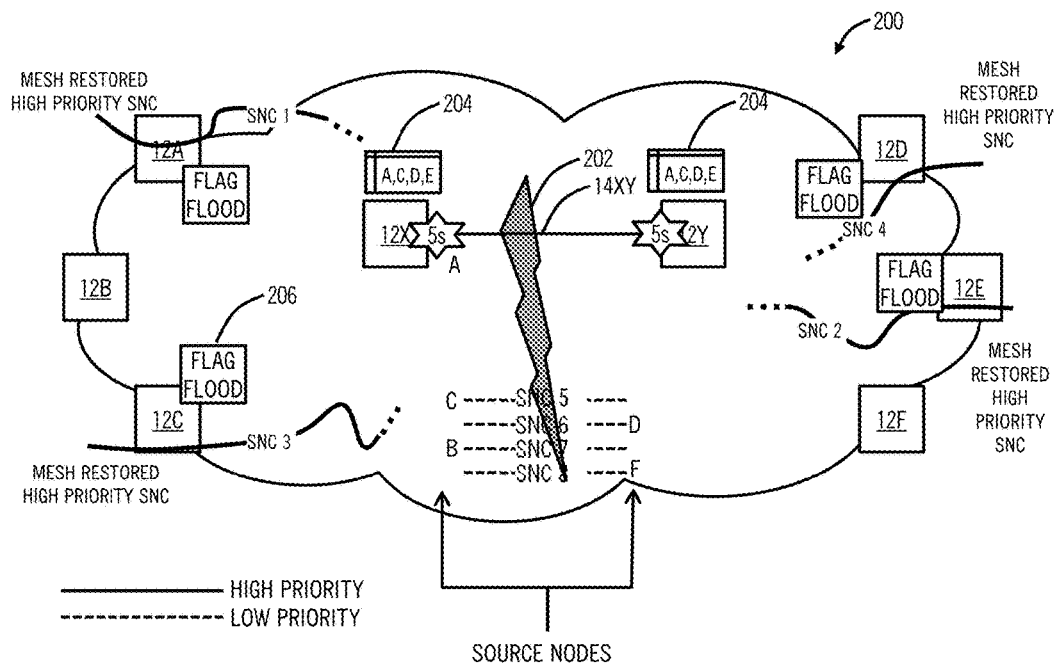

In FIG. 12, at step 130, once the source nodes 12A, 12C, 12D, 12E finish mesh restoring all of the high priority SNCs 1-4 originating thereon, then the source nodes 12A, 12C, 12D, 12E flood/advertise via their routing protocol a FLAG 206 indicating they have finished mesh restoring all of their high priority SNCs.

Figure 13:
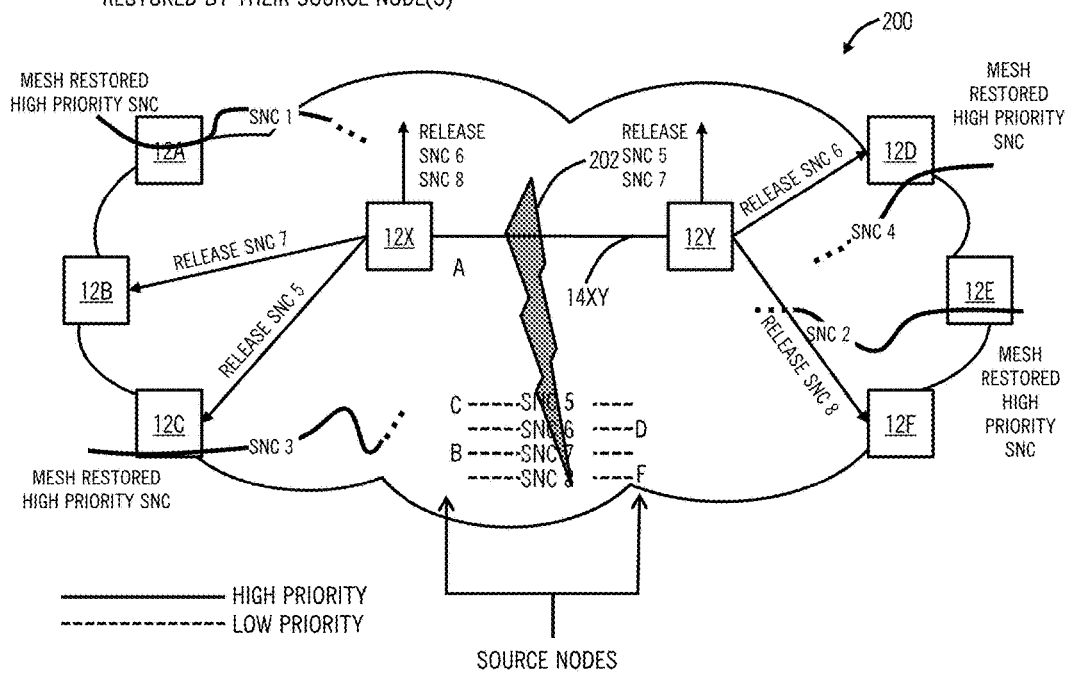
Figure 14:
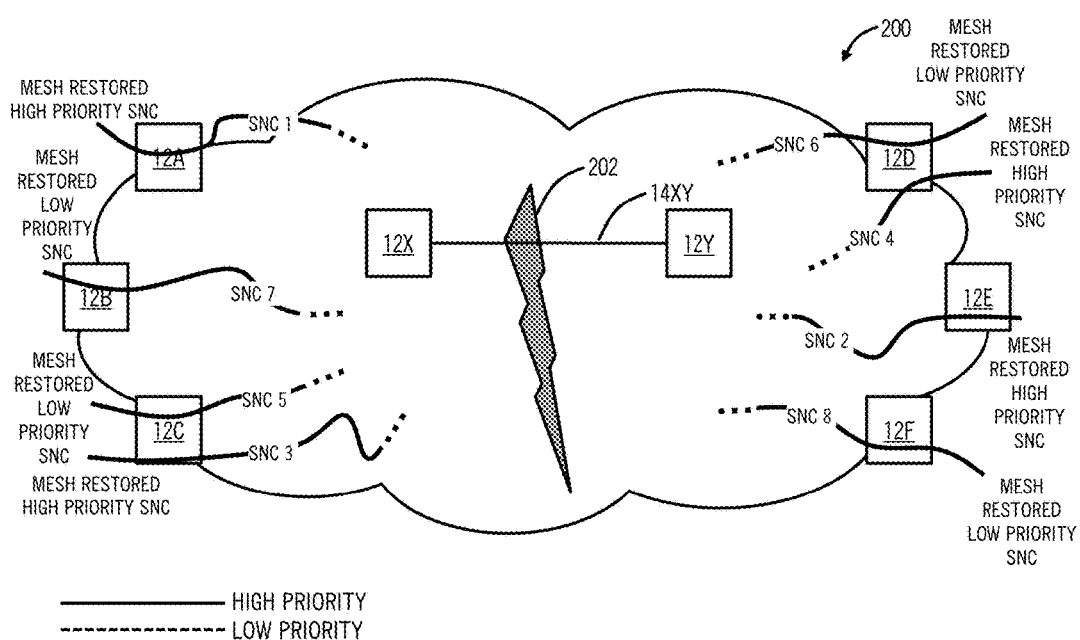

In FIG. 13, at step 132, when the nodes 12X, 12Y receive the FLAG 206 via flooding/advertisement from all of the source nodes 12A, 12C, 12D, 12E being tracked in the list 204, then the nodes 12X, 12Y trigger RELEASE messages for all of the low priority SNCs 5-8 such that the low priority SNCs 5-8 get mesh restored by their source nodes 12B, 12C, 12D, 12F. Finally, FIG. 14 illustrates the network 200 after all of the SNCs 1-8 have been mesh restored exclusive of the link 14XY. Of note, the low priority SNCs 5-8 restore immediately after the SNCs 1-4 are restored, without waiting extra, unnecessary time due to timers (LPHO timer).

Efficient Prioritized Mesh Restoration—Multiple Fault Example

Figure 15:
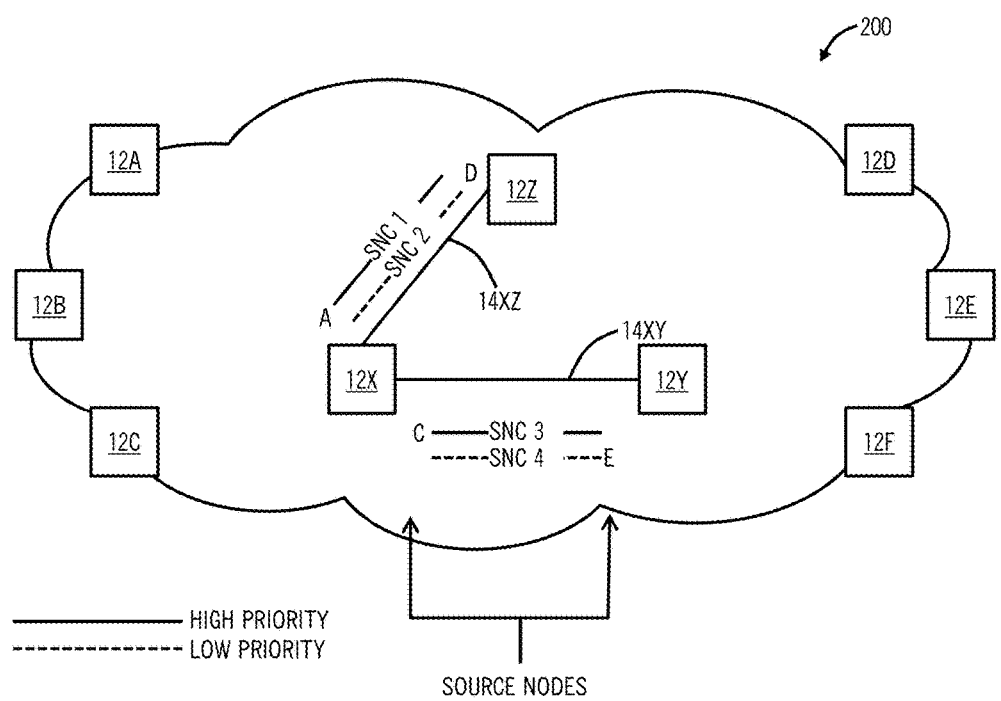
FIGS. 15-27 are network diagrams of a network showing mesh restoration techniques for four total SNCs including two high priority SNCs and two low priority SNCs using the processes of FIGS. 4 and 5, for multiple faults.

Referring to FIGS. 15-27, in an embodiment, network diagrams illustrate a network 200 showing mesh restoration techniques for four total SNCs including two high priority SNCs and two low priority SNCs using the processes 100, 150, for multiple faults. FIG. 15 illustrates the network 200 with nodes 12A, 12B, 12C, 12D, 12E, 12F, 12X, 12Y, 12Z, i.e., similar to the previous network 200 configuration with the additional node 12Z and an additional link 14XZ between the nodes 12Z, 12Z. For illustration purposes in FIGS. 15-17, links are omitted for ease of illustration except for the links 14XY, 14XZ. The network 200 is shown with four SNCs, labeled SNC 1, SNC 2, SNC 3, SNC 4. SNCs 1, 3 are high priority and SNCs 2, 4 are low priority. The SNCs 1, 2 traverse the link 14XZ and the SNCs 3, 4 traverse the link 14XY. The source node 12A is a source for the SNC 1, the source node 12D is a source for the SNC 2, the source node 12C is a source for the SNC 3, and the source node 12E is a source for the SNC 4.

Figure 16:
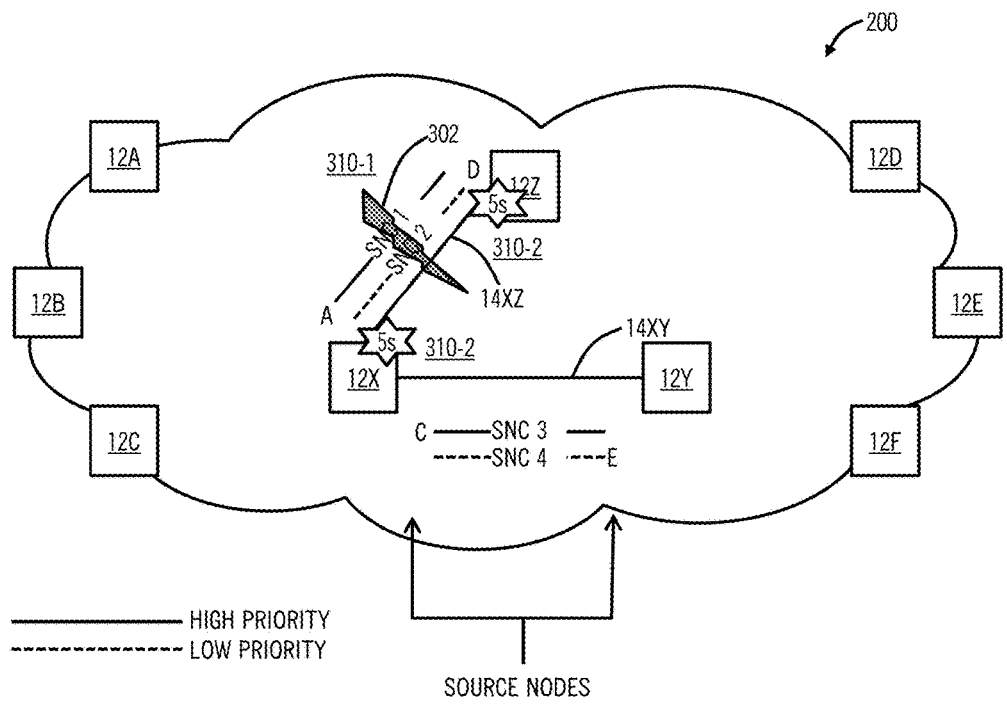
Figure 17:
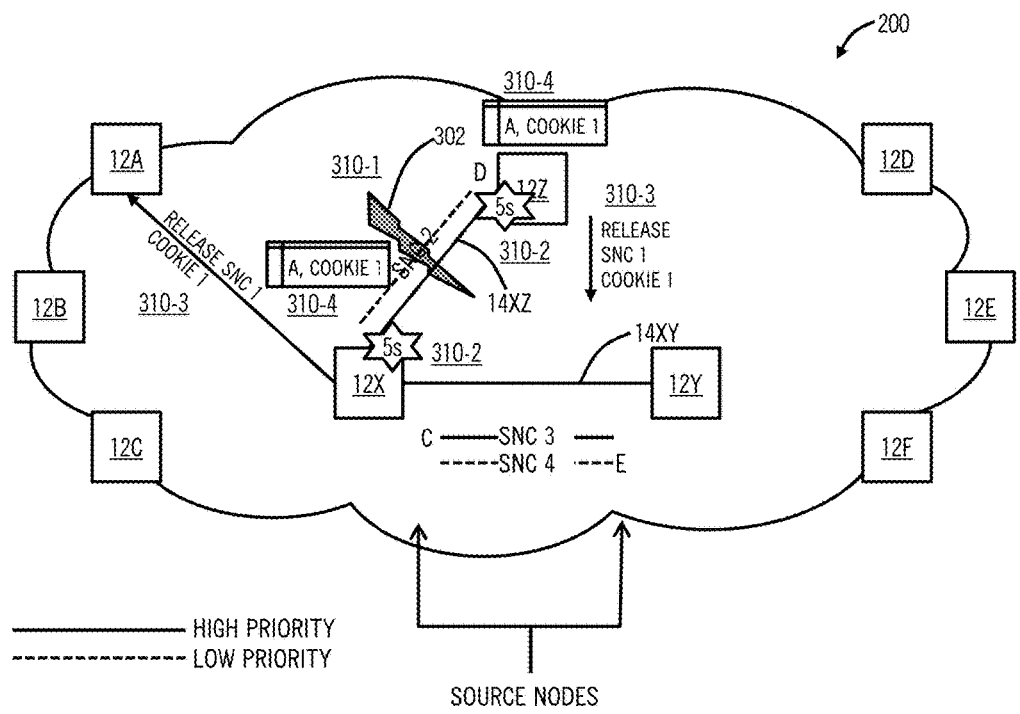
Figure 18:
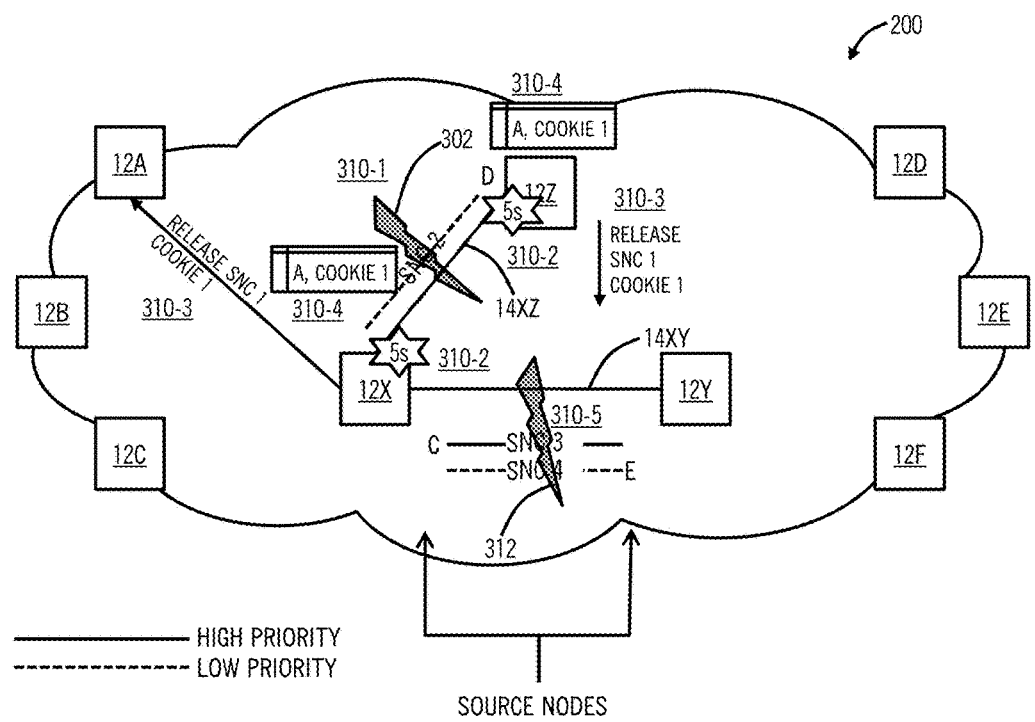
Figure 19:
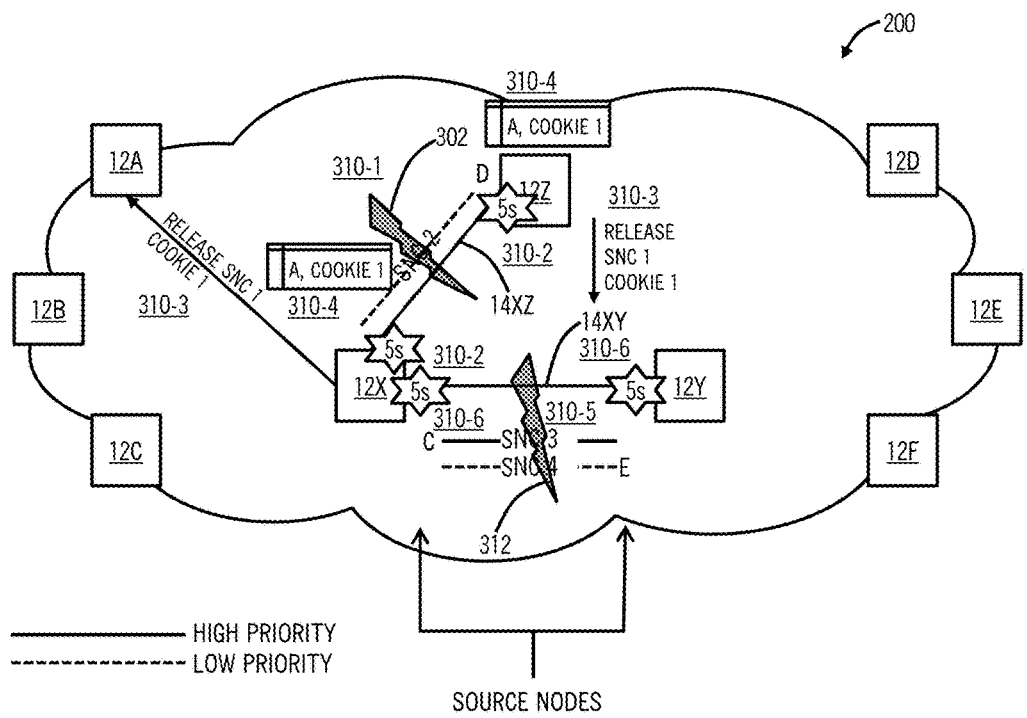

In FIG. 16, a fault 302 is experienced on the link 14XZ (step 310-1), and the LPHO timer is started at both the nodes 12X, 12Z adjacent to the fault 302 (step 310-2). In FIG. 17, the nodes 12X, 12Z provide a RELEASE message for the SNC 1 with a COOKIE 1 (step 310-3), and the nodes 12X, 12Z begin tracking the RELEASE message by noting the outstanding RELEASE for the SNC 1 to the node 12A with the COOKIE 1 at (step 310-4). In FIG. 18, a second fault 312 is experienced on the link 14XY (step 310-5). In FIG. 19, the LPHO timers are started at both the nodes 12X, 12Y adjacent to the fault 312 (step 310-6).

Figure 20:
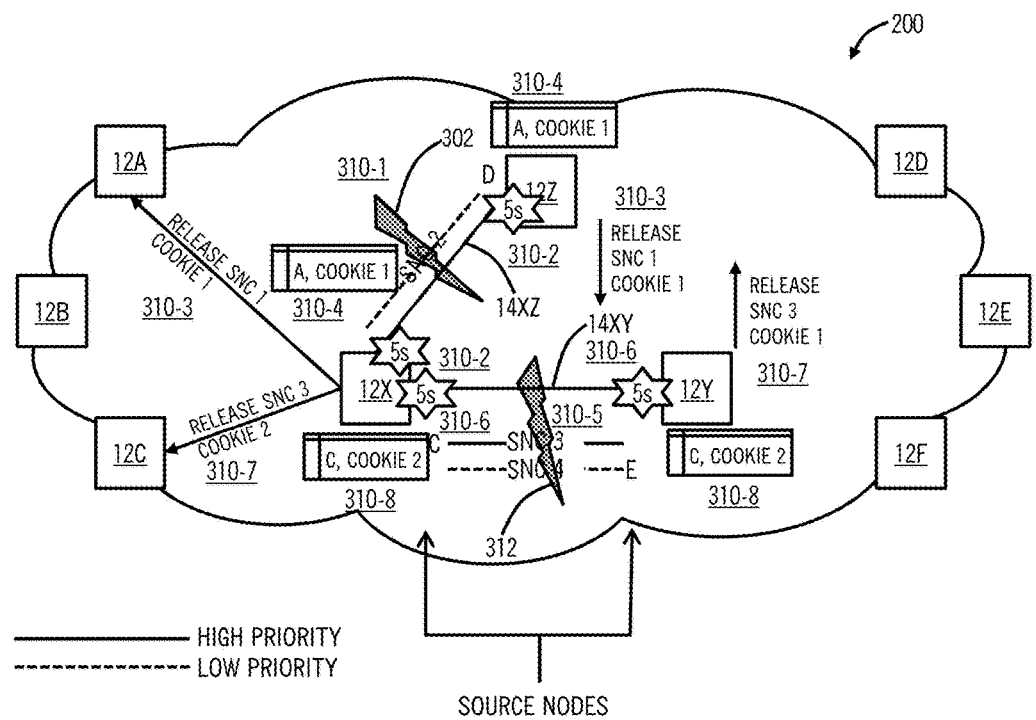
Figure 21:
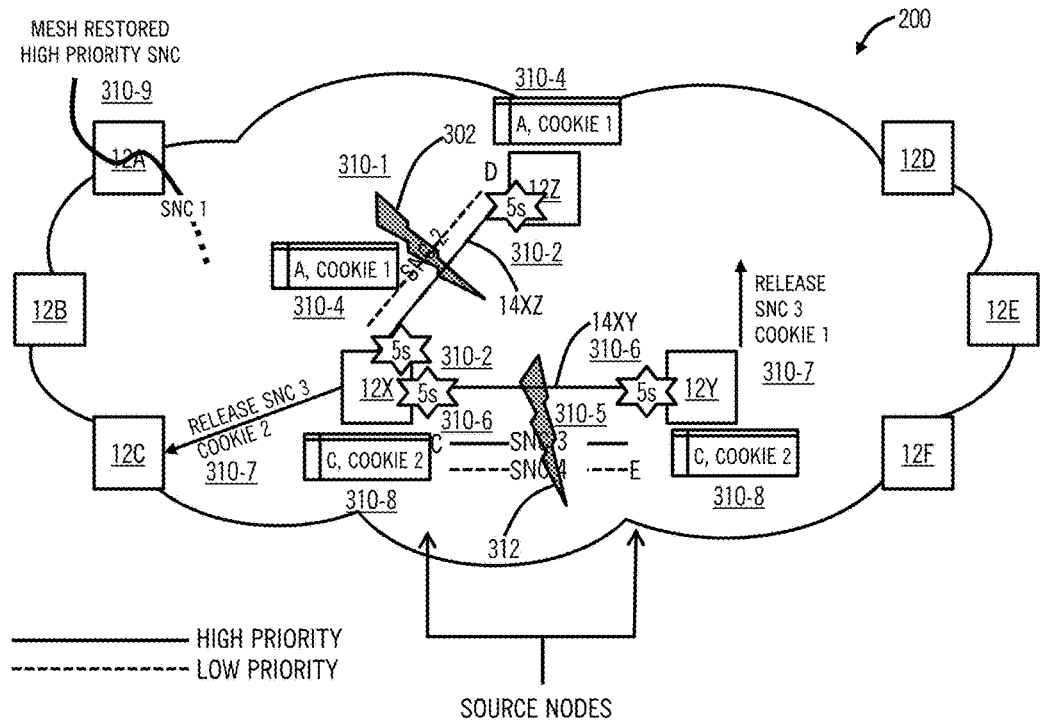
Figure 22:
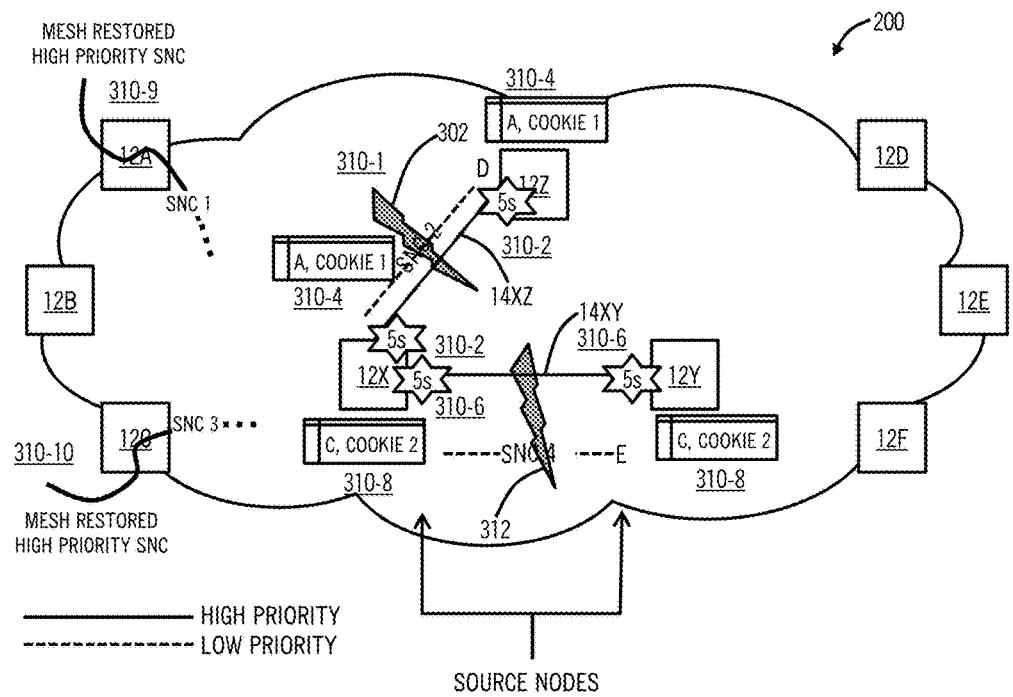
Figure 23:
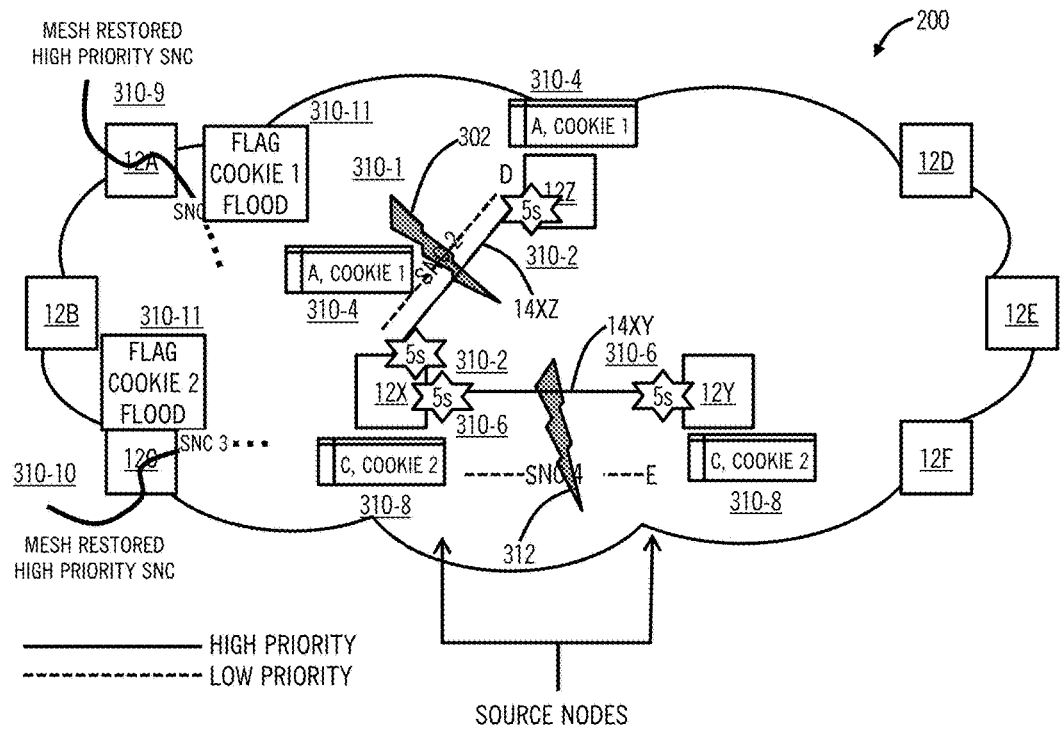

In FIG. 20, the nodes 12X, 12Y provide a RELEASE message for the SNC 3 with a COOKIE 2 (step 310-7), and the nodes 12X, 12Y begin tracking the RELEASE message by noting the outstanding RELEASE for the SNC 3 to the node 12C with the COOKIE 2 at (step 310-8). In FIG. 21, the high priority SNC 1 is mesh restored (step 310-9). In FIG. 22, the high priority SNC 3 is mesh restored (step 310-10). In FIG. 23, the source nodes 12A, 12C transmit FLAG floods. Specifically, the node 12A sends a FLAG with COOKIE 1, and the node 12C sends a FLAG with COOKIE 2 (step 310-11).

Figure 24:
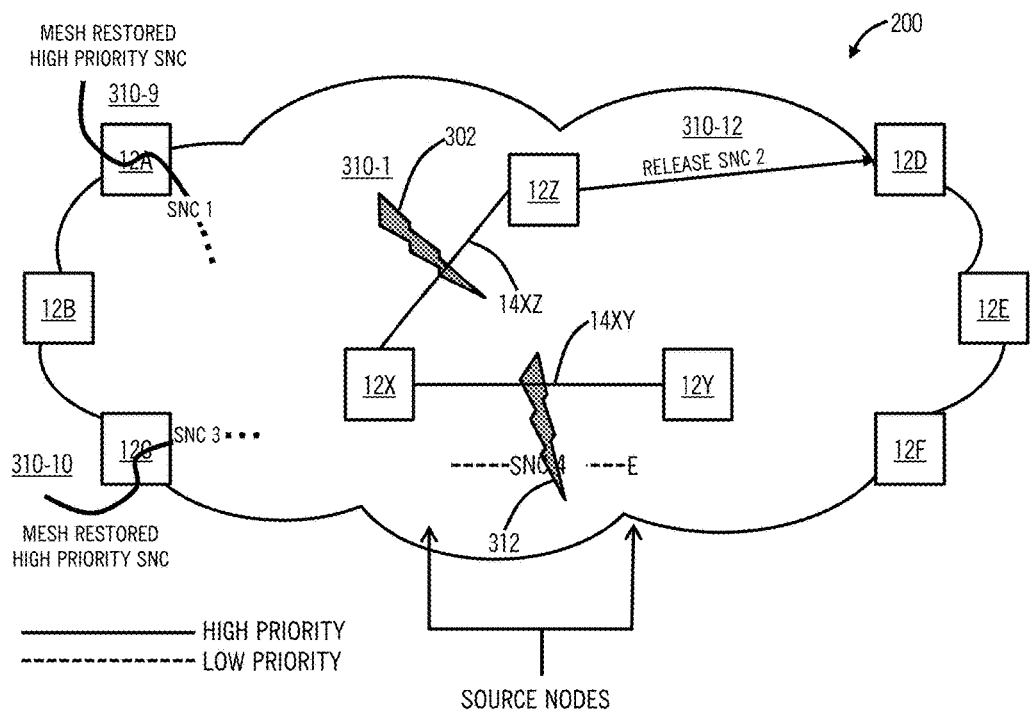
Figure 25:
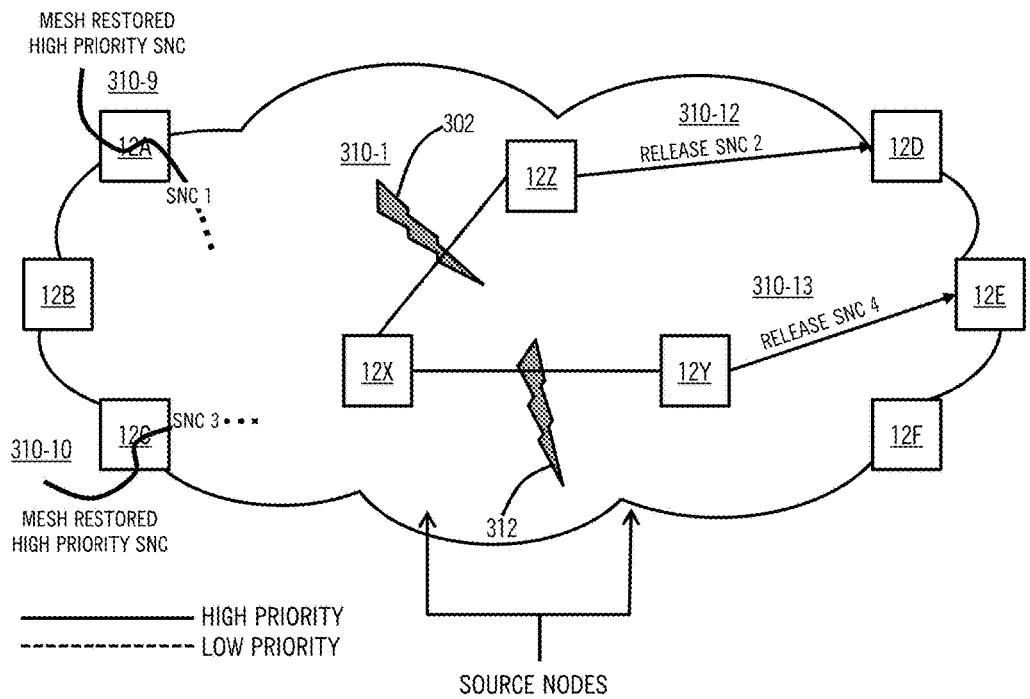
Figure 26:
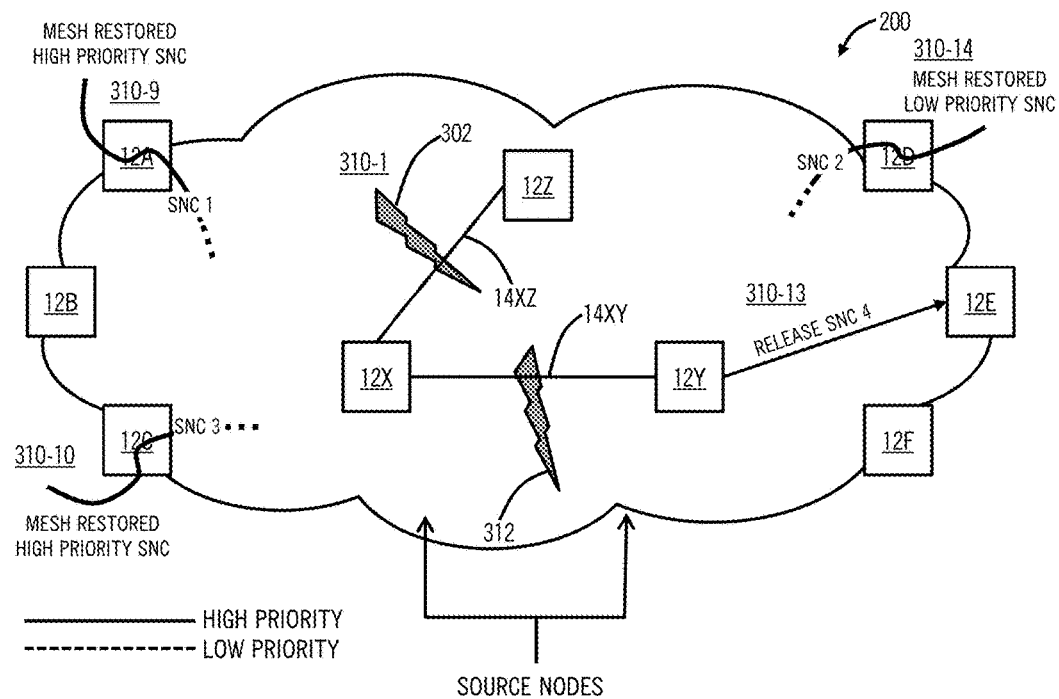
Figure 27:
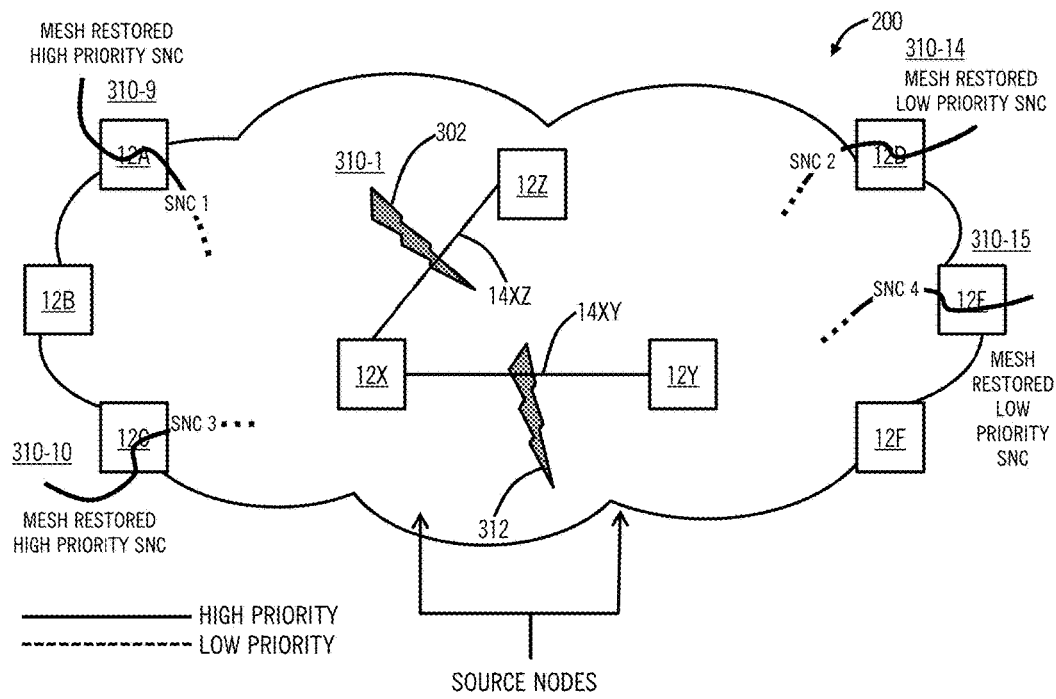

In FIG. 24, the node 12Z receives the FLAG with COOKIE 1 and determines the SNC 1 has mesh restored (the only high priority SNC on the affected link 14XZ) and subsequently releases the SNC 2 by sending a RELEASE message to the source node 12D (step 310-12). In FIG. 25, the node 12Y receives the FLAG with COOKIE 2 and determines the SNC 3 has mesh restored (the only high priority SNC on the affected link 14XY) and subsequently releases the SNC 4 by sending a RELEASE message to the source node 12E (step 310-13). In FIG. 26, the SNC 2 has been mesh restored (step 310-14), and finally, in FIG. 27, the SNC 4 has been mesh restored (step 310-15).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for efficient prioritized restoration of services implemented in a node in a network utilizing a control plane, the method comprising:
   releasing higher priority services affected by a fault on a link adjacent to the node immediately via control plane signaling such that the higher priority services mesh restore;
   tracking mesh restoration of the released higher priority services; and
   releasing lower priority services based on the tracking, subsequent to the mesh restoration of the higher priority services, wherein the higher priority services and the lower priority services comprise one or more of Optical Transport Network (OTN) connections, Dense Wavelength Division Multiplexing (DWDM) connections, and Multiprotocol Label Switching (MPLS) connections,
   wherein a source node for associated released higher priority services determines new paths for each and sends a control plane message which indicates the associated released higher priority have been addressed, and
   wherein the control plane message is sent after one of i) after the associated released higher priority services are addressed based on all release messages received in a time period and ii) after the associated released higher priority services are addressed based on knowing a quantity of the associated released higher priority services based on the control plane signaling.

2. The method of claim 1, wherein the higher priority services each have a unique identifier which is reflected from an associated source node to the node.

3. The method of claim 1, wherein the lower priority services are restored subsequent to the mesh restoration of the higher priority services, in lieu of utilizing a fixed timer for the lower priority services.

4. The method of claim 1, wherein the tracking is via control plane messages in the control plane.

5. The method of claim 4, wherein the control plane messages are flooded in the control plane based on the mesh restoration of the higher priority services.

6. The method of claim 1, wherein the associated released higher priority services are addressed by one of successful restoration, and a determination restoration is not possible.

7. The method of claim 1, wherein the releasing lower priority services comprises releasing subsequent to determining that all of the released higher priority services have been addressed in the network which is one of i) all of the released higher priority services are restored, ii) some of the higher priority services are unable to restore, and the remaining higher priority services are restored, and iii) expiration of a timer.

8. An apparatus configured to perform efficient prioritized restoration of services in a node in a network utilizing a control plane, the apparatus comprising:
   a network interface and a processor communicatively coupled to one another; and
   memory storing instructions that, when executed, cause the processor to
   cause release of higher priority services affected by a fault on a link adjacent to the node immediately via control plane signaling such that the higher priority services mesh restore;

track mesh restoration of the released higher priority services; and cause release of lower priority services responsive to the circuitry configured to track mesh restoration, subsequent to the mesh restoration of the higher priority services, wherein the higher priority services and the lower priority services comprise one or more of Optical Transport Network (OTN) connections, Dense Wavelength Division Multiplexing (DWDM) connections, and Multiprotocol Label Switching (MPLS) connections, wherein a source node for associated released higher priority services determines new paths for each and sends a control plane message which indicates the associated released higher priority have been addressed, and wherein the control plane message is sent after one of i) after the associated released higher priority services are addressed based on all release messages received in a time period and ii) after the associated released higher priority services are addressed based on knowing a quantity of the associated released higher priority services based on the control plane signaling.

9. The apparatus of claim 8, wherein the higher priority services each have a unique identifier which is reflected from an associated source node to the node.

10. The apparatus of claim 8, wherein the lower priority services are restored subsequent to the mesh restoration of the higher priority services, in lieu of utilizing a fixed timer for the lower priority services.

11. The apparatus of claim 8, wherein the released higher priority services are tracked via control plane messages in the control plane.

12. The apparatus of claim 11, wherein the control plane messages are flooded in the control plane based on the mesh restoration of the higher priority services.

13. The apparatus of claim 8, wherein the associated released higher priority services are addressed by one of successful restoration, and a determination restoration is not possible.

14. The apparatus of claim 8, wherein the releasing lower priority services comprises releasing subsequent to determining that all of the released higher priority services have been addressed in the network which is one of i) all of the released higher priority services are restored, ii) some of the higher priority services are unable to restore, and the remaining higher priority services are restored, and iii) expiration of a timer.

15. An apparatus configured to perform efficient prioritized restoration of services in a node in a network utilizing a control plane, the apparatus comprising:
a network interface and a processor communicatively coupled to one another; and
memory storing instructions that, when executed, cause the processor to
cause release of higher priority services affected by a fault on a link adjacent to the node immediately via control plane signaling such that the higher priority services mesh restore;
track mesh restoration of the released higher priority services; and
cause release of lower priority services responsive to the circuitry configured to track mesh restoration, subsequent to the mesh restoration of the higher priority services,
wherein the higher priority services and the lower priority services comprise one or more of Optical Transport Network (OTN) connections, Dense Wavelength Division Multiplexing (DWDM) connections, and Multiprotocol Label Switching (MPLS) connections, and
wherein the releasing lower priority services comprises releasing subsequent to determining that all of the released higher priority services have been addressed in the network which is one of i) all of the released higher priority services are restored, ii) some of the higher priority services are unable to restore, and the remaining higher priority services are restored, and iii) expiration of a timer.

16. The apparatus of claim 15, wherein the higher priority services each have a unique identifier which is reflected from an associated source node to the node.

17. The apparatus of claim 15, wherein the lower priority services are restored subsequent to the mesh restoration of the higher priority services, in lieu of utilizing a fixed timer for the lower priority services.

18. The apparatus of claim 15, wherein the released higher priority services are tracked via control plane messages in the control plane.

19. The apparatus of claim 18, wherein the control plane messages are flooded in the control plane based on the mesh restoration of the higher priority services.

20. The apparatus of claim 15, wherein a source node for associated released higher priority services determines new paths for each and sends a control plane message which indicates the associated released higher priority have been addressed.

* * * * *